(12) United States Patent
Tarnowski

(10) Patent No.: US 9,300,142 B2
(45) Date of Patent: Mar. 29, 2016

(54) METHOD FOR EMULATION OF SYNCHRONOUS MACHINE

(75) Inventor: Germán Claudio Tarnowski, Virum (DK)

(73) Assignee: Vestas Wind Systems A/S, Aarhus N. (DK)

( * ) Notice: Subject to any disclaimer, the term of this patent is extended or adjusted under 35 U.S.C. 154(b) by 494 days.

(21) Appl. No.: 13/575,577

(22) PCT Filed: Jan. 26, 2011

(86) PCT No.: PCT/EP2011/051049
§ 371 (c)(1),
(2), (4) Date: Jul. 26, 2012

(87) PCT Pub. No.: WO2011/092193
PCT Pub. Date: Aug. 4, 2011

(65) Prior Publication Data
US 2012/0292904 A1    Nov. 22, 2012

Related U.S. Application Data

(60) Provisional application No. 61/298,386, filed on Jan. 26, 2010.

(30) Foreign Application Priority Data

Jan. 26, 2010 (DK) .................................. 2010 00060

(51) Int. Cl.
*G06G 7/56* (2006.01)
*H02J 3/38* (2006.01)
(Continued)

(52) U.S. Cl.
CPC . *H02J 3/386* (2013.01); *H02P 9/42* (2013.01); *H02P 21/0003* (2013.01); *H02P 21/14* (2013.01); *H02P 2101/15* (2015.01); *Y02E 10/763* (2013.01)

(58) Field of Classification Search
CPC ............... H02J 3/386; H02J 3/38; H02P 9/42; H02P 21/14; H02P 21/0003; H02P 21/145; H02P 23/14
USPC .......................................................... 703/2/5
See application file for complete search history.

(56) References Cited

U.S. PATENT DOCUMENTS 7,508,173 B2 *  3/2009 Zhou et al. .................... 323/207
7,804,184 B2 *  9/2010 Yuan ....................... H02J 3/386
290/44

(Continued)

FOREIGN PATENT DOCUMENTS

GB          2432267 A      5/2007
WO      2009022198 A2      2/2009

(Continued)

OTHER PUBLICATIONS

Hansen et al. ("Initialisation of Grid-Connected Wind Turbine Models in Power-System Simulations", Wind Engineering vol. 27, No. 1, 2003 pp. 21-38 ).*

(Continued)

*Primary Examiner* — Omar Fernandez Rivas
*Assistant Examiner* — Iftekhar Khan
(74) *Attorney, Agent, or Firm* — Patterson & Sheridan, LLP

(57) ABSTRACT

The present invention relates to electric energy sources, such as a single wind power turbine or wind power plant, that are interfaced with the utility grid through power electronic converters. In particular, the present invention relates to specific techniques and methodologies for power electronic converters for stabilizing the utility grid during transient conditions and for providing similar stability mechanisms that are inherently present in electric synchronous generators while maintaining the possibility for fast and decoupled following of set points for generated active and/or reactive powers.

19 Claims, 6 Drawing Sheets

(51) Int. Cl.
  *H02P 9/42* (2006.01)
  *H02P 21/00* (2006.01)
  *H02P 21/14* (2006.01)
  *H02P 101/15* (2015.01)

(56) References Cited

U.S. PATENT DOCUMENTS

| | | | |
|---|---|---|---|
| 7,839,024 B2* | 11/2010 | Cardinal et al. | 307/84 |
| 8,058,753 B2* | 11/2011 | Achilles et al. | 307/153 |
| 2008/0296898 A1* | 12/2008 | Ichinose et al. | 290/44 |
| 2009/0218817 A1* | 9/2009 | Cardinal et al. | 290/44 |
| 2010/0256970 A1* | 10/2010 | Heese et al. | 703/18 |
| 2010/0332040 A1* | 12/2010 | Garcia | 700/287 |
| 2013/0314956 A1* | 11/2013 | Tang | H02M 7/003 363/54 |

FOREIGN PATENT DOCUMENTS

| | | |
|---|---|---|
| WO | 2010000664 A2 | 1/2010 |
| WO | WO 2010000664 A2 * | 1/2010 |
| WO | 2010022766 A1 | 3/2010 |
| WO | 2010055322 A2 | 5/2010 |

OTHER PUBLICATIONS

Janssens et al. ("Active Power Control Strategies of DFIG Wind Turbines", IEEE Power Tech 2007, pp. 1-6).*

Qiao et al. ("Grid Connection Requirements and Solutions for DFIG Wind Turbines", IEEE 2008, pp. 1-8).*

Achilles et al. ("Direct Drive Synchronous Machine Models for Stability Assessment of Wind Farms", digsilent, 2003, pp. 1-9).*

Mi et al. ("Modeling and Control of a Variable-Speed Constant-Frequency Synchronous Generator With Brushless Exciter", IEEE, 2004, pp. 565-573).*

Taylor & Francis Group ("Testing of Synchronous Generators", Academia.edu, 2006, pp. 1-57).*

Search Report for Danish Patent Application No. PA 2010 00060 dated Aug. 26, 2010.

International Search Report and Written Opinion dated Sep. 6, 2011, for International Application PCT/EP2011/051049.

Beck et al.: "Virtual Synchronous Machine", 9th International Conference on Electrical Power Quality and Utilisation, Oct. 2007, Barcelona, Spain, Oct. 9-11, 2007, published by IEEE, Piscataway, NJ, USA.

Van Wesenbeeck et al.: "Grid Tied Converter with Virtual Kinetic Storage", IEEE Bucharest PowerTech Conference, Bucharest, Romania, Jun. 28 to Jul. 2, 2009, published by IEEE, Piscataway, NJ, USA.

Torres et al.: "Virtual Synchronous Generator Control in Autonomous Wind-Diesel Power Systems", IEEE Electrical Power & Energy Conference (EPEC), Oct. 22-23, 2009, published by IEEE, Piscataway, NJ, USA.

Driesen et al.: "Virtual Synchronous Generators", Power and Energy Society General Meetings—Conversion and Delivery of Electrical Energy in the 21st Century, Jul. 20-24, 2008, published by IEEE, Piscataway, NJ, USA.

* cited by examiner

METHOD FOR EMULATION OF SYNCHRONOUS MACHINE

FIELD OF THE INVENTION

The present invention relates to a control system methodology for Voltage Source Converters (VSC). In particular, the control system emulates an inherent response of a synchronous machine connected to utility grids in that it reproduces the favorable stability mechanisms present in a synchronous generator while maintaining the possibility for fast and decoupled following of set points for generated active and/or reactive powers.

BACKGROUND OF THE INVENTION

The paper "Virtual Synchronous Machine" by Hans-Peter Beck & Ralf Hesse; Proceedings Electrical Power Quality and Utilization—EPQU 2007, $9^{th}$ International, 9-11 Oct. 2007, and WO 2009/022198 represent the available prior art. Hans-Peter et al. apply the term Virtual Synchronous Machine (VISMA), whereas WO 2009/022198 uses the term Conditioning Device for Energy Supply Networks. The latter is based on today's inverter technology where it is possible to specify the controller properties in such a way that it acts like a synchronous machine connected to a power grid.

The VISMA is based on the complete two-axis dynamic mathematical model of an electrically excited synchronous machine. This dynamic model is fully described by the d-q-axis electrical parameters of the stator, the exciter and the damper as well as by the magnetic coupling and the mass inertia of a virtual rotor. The full analogy with the synchronous machine is established on the basis of virtual values of torque and excitation voltage. Due to the analogy to a synchronous machine, conventional grid operation is possible in parallel with conventional synchronous machines.

In practice, the VISMA basically measures the terminal voltages at the point of connection with the grid and then calculates in real time the equivalent currents of a synchronous machine. Then the calculated machine currents are the reference values for a current controller which is controlling the injected currents into the grid by means of an inverter. The inverter must always be capable of feeding into the grid the current value calculated with the machine model otherwise the VISMA looses its linear properties.

To control the VISMA in analogy with the synchronous machine, the virtual shaft is provided with a virtual torque value for transferring active power to the grid. To change the transferred active power a change in the virtual torque must be done. Then the active power variation will follow the dynamics of the simulated rotor (rotor swings). The virtual shaft stabilizes at a new angle, said angle being associated with a slow dynamic and overshot in the active power.

Also a virtual excitation is provided that can be used for terminal voltage control. Sufficient computational capacity is necessary to build the real time machine model.

It is an object of the present invention to provide a faster and a simpler way for emulating a synchronous machine while maintaining the possibility for fast and decoupled following of set points for generated active and/or reactive powers.

DESCRIPTION OF THE INVENTION

Generally, the present invention relates to the field of electric energy sources that are interfaced with the utility grid through power electronic converters, e.g. wind power, solar photovoltaic or energy storage systems. In particular, the present invention relates to specific techniques and methodologies so that power electronic converters can stabilize the utility grid during transient conditions and for providing similar stability mechanisms that are inherently present in electric synchronous generators.

Power electronic converters, such as VSCs, connected to a utility grid are normally designed to provide active and reactive power to the utility grid with the powers being decoupled and independent of system frequency and terminal voltage. One advantage of power electronic converters is the capability for fast and decoupled following of set points for generated active and reactive powers.

Synchronous generators normally applied in power systems have an inherent capability to support the frequency and the voltage of utility grids during transients, such as sudden failure of power generation, line faults or large load variations. Several stability mechanisms are inherently provided by synchronous generators, such as inertial response, voltage response, synchronizing torque, power swings damping and others.

In a power system where the number of converter-interfaced electricity sources is constantly increasing the necessary mechanisms for power system stability are decreasing as the relative amount of synchronous generators is reduced which brings power system stability problems.

The present invention relates to a control system methodology for VSCs that emulates the synchronous machine inherent response including the favorable stability mechanisms for grid support. Moreover, the synchronous machine keeps the advantage associated with power electronics converters, namely fast and decoupled following of set points for generated active and/or reactive powers.

Moreover, synchronous generator systems interfaced to a utility grid with power converters (such as variable speed wind turbines with full converters, solar photovoltaic generators or energy storage devices) will have the same inherent behavior as conventional synchronous generators: e.g. automatic inherent inertial reaction (which is important for power system stability), frequency control participation, automatic load share, power system damping, automatic parallel/stand alone operation.

The following advantages are associated with the emulation of a synchronous machine:
- Automatic inherent active power output change due to (and in proportion to) a voltage magnitude and/or angle change in the connection point. The same applies to reactive power output.
- Possibility for connecting the VSC in parallel with a power system, others VSCs or with conventional synchronous generators in the same way as a conventional synchronous machine.
- Automatic inherent inertial reaction (inertia emulation) as active power output variation in the same way as a synchronous machine (no grid frequency measurement is needed).
- Possibility of tuning the desired emulated inertia: statically or dynamically, locally or remotely, independently or coordinated with other VSCs devices.
- Automatic inherent load share among others VSCs and/or other conventional synchronous generators.
- No need for Phase-Locked Loop (PLL) for VSC control system which avoids several problems during required special operation of grid connected VSCs, such as Low Voltage Ride Through operation.

Grid frequency control capabilities: Possibility for frequency control coordination with conventional synchronous machines or others VSCs in parallel.

Possibility for going to stand alone operation and further resynchronization to others VSCs or synchronous generators.

Possibility for adding further functionalities as a conventional synchronous generator such as "Damping" and "Synchronizing Power" for power system stability.

Possibility for tuning the control system to provide a desired dynamic response.

Modification in emulated parameters can be done for good power system tuning, which is impossible in a given synchronous machine.

Possibility of having conventional synchronous machine control strategies such as voltage, frequency, active and reactive power control.

Hybrid control system: Combining fast decoupled vector control methodology for P and Q control with synchronous machine response mechanisms for grid stability.

Actual STATCOM devices can be modified with this new functionality, making it possible to operate as an energy storage system and behaves as a conventional synchronous machine when needed.

The above-mentioned object and advantages are achieved by providing, in a first aspect, a method for emulating the behavior of an electric energy source operatively connected to a power utility grid in response to grid-related events, the method comprising the step of calculating one or more response scenarios of said electric energy source in relation to one or more selected electrical parameters wherein said electric energy source is modeled in such a way that it behaves essentially as a synchronous machine.

The method according to the first aspect of the present invention may be considered having the following main features: Automatic inherent active and reactive power response to utility grid events, inertial response for active power imbalances in the utility grid, i.e. frequency stability, dynamic transient voltage support (voltage stability), active power swings damping, and fast decoupled active/reactive power control. Moreover, the method according to the present invention may be freely programmable for desired dynamic behavior for appropriate grid support.

The term "electric energy source" should be understood broadly. Thus, this term may cover any technical facility capable of generating electric power, such as for example a wind power facility implemented as for example a single wind turbine or a group/plurality of wind turbines forming a wind power plant.

The synchronous machine may comprise one or more synchronous generators.

One of the selected parameters may involve an active power response to power utility grid events, a reactive power response to power utility grid events and/or inertial response to active power imbalances in the power utility grid. Moreover, one of the selected parameters may involve voltage response and/or active power swings damping.

In a second aspect, the present invention relates to a computer program product for carrying out the method according to the first aspect of the present invention when said computer program product is run on a computer.

In a third aspect the present invention relates to a method for emulating the behavior of an electric energy source operatively connected to a power utility grid in response to grid-related events, the method comprising the steps of implementing a simulation model wherein said electric energy source is modeled in such a way that it behaves essentially as a synchronous machine, and calculating one or more response scenarios of said electric energy source in relation to one or more selected electrical parameters.

Again, the term "electric energy source" should be understood broadly. Thus, this term may cover any technical facility capable of generating electric power, such as for example a wind power facility implemented as for example a single wind turbine or a group/plurality of wind turbines forming a wind power plant.

One of the selected parameters may be selected from a group consisting of: an active power response to power utility grid events, a reactive power response to power utility grid events, inertial response to active power imbalances in the power utility grid, voltage response and active power swings damping.

In a fourth and final aspect, the present invention relates to a computer program product for carrying out the method according to the third aspect when said computer program product is run on a computer.

BRIEF DESCRIPTION OF THE INVENTION

The present invention will now be explained in further details with reference to the accompanying figures, where FIG. 1 shows a block diagram of the invention, FIG. 2 illustrates the variation of the dynamic components of VSC voltages ΔEd' and ΔEq' due to a utility grid event reflected as variation on utility grid voltages V' and/or VSC currents I', FIG. 3 illustrates fast variations of the static components of VSC voltages Eds and Eqs due to set point changes on active and/or reactive power by manipulating algebraic variables, FIG. 4 shows the reactive power reaction (output) due to an inductive load connection in parallel with synchronous generators in a weak utility grid, FIG. 5 shows the active power reaction output (B line) due to a resistive load connection in parallel with synchronous generators in a weak utility grid, FIG. 6 shows the decoupled changes on generated active (Pe) and reactive (Qe) powers following a set point change whit the VSC being connected to a strong utility grid, FIG. 7 Comparison of active powers resulting from set point changes on the invention (B line) against conventional synchronous machine (A line) where the rotor swings are reflected, FIG. 8 illustrates calculation of d-q dynamic components ΔEd' and ΔEq' and calculation of d-q static components Eds and Eqs and summation point, and FIG. 9 illustrates a rotating reference frame angle calculation.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

The following nomenclature will be applied in connection with the detailed description of the present invention:

TABLE 1

Nomenclature

| | |
|---|---|
| Configuration | inputs of pre-defined algorithms and parameters for programming the calculating unit |
| d-q | common unique rotating reference frame with direct axis (d) and quadrature axis (q) |
| E | module of the line-to-line RMS terminal voltage of the VSC in fundamental frequency |
| E(t) | instantaneous value of the VSC line-to-line terminal voltage |
| $\overline{E}$ | phasor of the line-to-line terminal voltage of the VSC in fundamental frequency |
| $\overline{E}'$ | new VSC terminal voltage as result of a change from $\overline{E}$ |
| Ed | calculated component of the voltage $\overline{E}$ on the direct axis reference frame (d) |
| Eq | calculated component of the voltage $\overline{E}$ on the quadrature axis reference frame (q) |
| Eds | calculated static component of Ed from actual values of Vd, Vq, Po and Qo. |
| Eqs | calculated static component of Eq from actual values of Vd, Vq, Po and Qo. |
| ΔEd' | calculated dynamic transient component of Ed as result of Vd and/or Vq and/or Id and/or Iq changes |
| ΔEq' | calculated dynamic transient component of Eq as result of Vd and/or Vq and/or Id and/or Iq changes |
| f | electrical frequency |
| I | module of the RMS terminal current of the VSC in fundamental frequency |
| I(t) | instantaneous value of the VSC phase current |
| $\overline{I}$ | phasor of the terminal current of the VSC in fundamental frequency |
| $\overline{I}'$ | new current from VSC terminals as result of a change from $\overline{I}$ |
| Iabc | instantaneous measured values of three phases VSC terminals currents |
| Id | component of the VSC phase current measured in the direct axis (d) |
| Iq | component of the VSC phase current measured in the quadrature axis (q) |
| Mode | external signal to indicate the control mode as Q control or V control and P control or f control. |
| P | active power |
| Po | active power established as target |
| Pe | instantaneous active power in the grid connection point (measured) |
| Q | reactive power |
| Qo | reactive power established as a target |
| Qe | instantaneous reactive power in the grid connection point (measured) |
| Ref Q/V | reference values for Q and V |
| Ref P/f | reference values for P and f |
| SG | Synchronous Generator |
| v | module of the RMS voltage in the point of grid connection in fundamental frequency |
| $\overline{V}$ | phasor of the voltage in the point of grid connection in fundamental frequency |
| $\overline{V}'$ | new voltage in the point of grid connection as result of a change from $\overline{V}$ |
| Vd | component of the voltage in the point of grid connection measured in the direct axis (d) |
| Vq | component of the voltage in the point of grid connection measured in the quadrature axis (q) |
| Vdq | compound nomenclature to identify Vd and Vq |
| VSC | Voltage Source Converter |
| Vabc | instantaneous measured values of three phase voltages on the grid connection point |
| θe | calculated instantaneous rotated angle of the d-q reference frame |
| δ | angle between phasors $\overline{E}$ and $\overline{V}$ |
| δ' | new angle between phasors $\overline{E}$ and $\overline{V}$ as a result of a change in $\overline{E}$ and/or $\overline{V}$ |
| ωe | rotating speed of the d-q reference frame, which is equivalent to the electrical frequency in steady state |
| R + jX | equivalent impedance of the adjustable interface (3) with resistance R and reactance X |

In functional terms the present invention aims at providing a method for operating and controlling a three phase Voltage Source Converter (VSC) operatively connected to a grid interface impedance or a transformer, such as an adjustable transformer, with the object of emulating the inherent behavior of a conventional synchronous generator in terms of instantaneous inherent variations of active and reactive powers output due to grid voltage variations in magnitude and/or angle.

A model suitable for implementing the present invention is depicted in the block diagram shown in FIG. 1, wherein a calculating unit 1 is configured to receive the following input signals: Vabc, Iabc, Po, Qo, and Configuration. Moreover, the calculating unit 1 provides the following output signals: Ed, Eq, θe, Pe, ωe, Qe, and Vdq. The individual input and output signals will be described in further details below.

The calculating unit 1 provides the voltage components Ed and Eq and the angle θe of the rotating internal reference frame for the VSC unit 5. Moreover, it receives signals from the measuring device 4 and from the control unit 7, and it can be configured with different desired parameters.

Internally the calculating unit 1 contains function blocks for generating static components 9 and dynamic transient components 8 of Ed and Eq along with the instantaneous rotated angle θe of the internal d-q reference frame 10.

The calculating unit 1 also contains a function block 14 for decomposing the Vabc measured voltages into Vd and Vq components and the Iabc measured currents into Id and Iq components on the d-q reference frame. Furthermore, the calculating unit 1 contains a function block 11 for calculating the instantaneous active power Pe and the instantaneous reactive power Qe in the point of connection with the grid.

The calculating unit 1 has a Configuration input with pre-defined algorithms and/or parameters for providing the device with the desirable static and dynamic response. The Configuration input can be coordinated with the design of the interface impedance 3. The input value of Po is a manipulated signal that can be used for active power control or frequency control. The input value of Qo is a manipulated signal that can be used for reactive power control or voltage control. A change in Po or Qo produce an instantaneous change in generated active or reactive power form the VSC unit 5, respectively. The utility grid 2 is the energy network to which the VSC unit 5 is connected via the interface impedance 3 and to which active power Pe and reactive power Qe are delivered or absorbed according to the utility grid inherent requirements for stability and support, and according to control actions.

The interface impedance 3 is positioned in the energy path between the VSC unit 5 and the utility grid 2. Preferably, the interface impedance is adjustable or designed in coordination with the parameters and algorithms configured in the calculating unit 1 in order to obtain a desirable voltage harmonic filtering and a desired inherent active and reactive power output from the VSC unit 5 in response to utility grid 2 events.

The measuring unit 4 measures instantaneous values of three phase voltages and currents in the connection point with the utility grid 2.

The VSC unit 5 handles the following inputs from the calculator unit 1: Ed, Eq, and θe. Moreover, it provides the following outputs: Pe, Qe in the form of voltages and currents.

The VSC unit 5 includes a power electronic inverter for generating alternating three phase voltages, the inverter being operatively connected to a direct voltage source 6 and to the utility grid 2 through the interface impedance 3. The switching power electronics with appropriate algorithm generates three phase alternating voltage E from calculated components Ed and Eq and calculated rotating reference frame angle θe.

The direct voltage energy source 6 connected to the VSC unit 5 is capable of delivering or absorbing active and reactive powers to the VSC unit 5 and maintaining the DC voltage level inside a limited range.

The control unit 7 receives the following inputs: Ref Q/V, Ref P/f, Mode, Pe, f, Qe and V, and generates the following outputs to the calculating unit 1: Qo, Po. The control system as shown in FIG. 1 is operable in four different modes of operation: 1) active power control; 2) electrical frequency control; 3) reactive power control; 4) voltage control. It manipulates the input Po of the calculating unit 1 for active power control or frequency control, and the input Qo of the calculating unit 1 for reactive power control or voltage control.

Calculations of the dynamic transient voltages components, ΔEd' and ΔEq', of the voltages Ed and Eq, respectively, for the VSC unit 5 are based on actual values of voltages Vd and Vq and currents Id and Iq in the connection point with the utility grid 2.

The dynamic components calculator 8 provides a dynamic transient variation of the terminal voltage E of the VSC unit 5 in response to changes in voltages Vd and/or Vq and/or changes in currents Id and/or Iq. The dynamic transient components, ΔEd' and ΔEq', can be calculated in order to emulate the dynamic behavior of the internal voltage of a synchronous machine, or in a different way in accordance with a desired dynamical behavior of the voltage E during grid events. The dynamic components calculator 8 communicates with the static components calculator 9 for enhancing the dynamic response.

Calculations of the static voltages components, Eds and Eqs, of the voltages Ed and Eq, respectively, for the VSC unit 5 are based on external inputs of the active power target, Po, and the reactive power target, Qo, and actual voltage components of the utility grid 2, Vd and Vq, expressed in the internal reference frame. The static components calculator 9 has no dynamic calculations and performs an algebraic calculation that permits very fast changes of generated active or reactive powers, Pe and Qe, from the VSC unit 5 by changing the Ed and Eq components in response to decoupled changes in Po and/or Qo. The static components calculator 9 communicates with the dynamic components calculator 8 for enhancing static response.

The rotating reference frame angle calculator 10 calculates the internal reference frame instantaneous rotated angle θe with dynamics that emulates the rotor swings of a synchronous machine including damping characteristics. This calculation is based on actual values of target active power Po and generated active power Pe. The θe calculation can be freely programmed to introduce stability mechanism as Synchronizing Power and Inertial Response in a similar way as a synchronous machine. The dynamic behavior of θe can include programmable damping characteristics that improve the active power swings for utility grid (2) support. The instantaneous active and reactive power measurement unit 11 calculates the three-phase instantaneous values of the active and reactive powers interchanged in the point of connection with the utility grid 2.

The supervisory function for limitation and protection 12 monitors and evaluates the operation limits of the VSC unit 5. It carries out limitation actions on critical values inside the calculating unit 1 and protects the VSC unit 5 against damaging actions.

The summation point 13 adds the respective static components, Eds and Eqs, from the calculator 9 with the dynamic transient components, ΔEd' and ΔEq', from the calculator 8 to generate the voltage components inputs Ed and Eq for the VSC unit 5.

The internal reference frame axis transformation unit 14 transforms the three-phase instantaneous values of voltages and currents from measuring unit 4 to respective components of voltages Vd and Vq and currents Id and Iq represented on an arbitrary rotating d-q axis reference frame with angle θe given by the rotating reference frame angle calculator 10.

As already mentioned, the present invention relates to a strategy for operating and controlling a three phase VSC unit 5 with grid interface impedance 3. One objective of the present invention is to emulate the inherent behavior of a conventional synchronous generator for utility grid 2 support in terms of instantaneous inherent variations of active and/or reactive powers output due to grid voltage variations in magnitude and/or angle with the possibility of fast and decoupled following of set points for generated active and/or reactive powers.

The VSC unit 5 generates balanced three phase terminal voltages with a phase-to-phase value E(t). In the fundamental frequency E(t) can be represented as a phasor $\overline{E}$. When the VSC unit 5 is synchronized to a utility grid 2 with voltage $\overline{V}$ through interface impedance 3 the flow of active power Pe and reactive power Qe in the point of connection with the utility grid 2 is given respectively by:

$$Pe = \frac{R}{R^2 + X^2} \cdot E \cdot V \cdot \cos(\delta) + \frac{X}{R^2 + X^2} \cdot E \cdot V \cdot \sin(\delta) - \frac{R}{R^2 + X^2} \cdot V^2 \quad (1.1)$$

$$Qe = \frac{X}{R^2 + X^2} \cdot E \cdot V \cdot \cos(\delta) - \frac{R}{R^2 + X^2} \cdot E \cdot V \cdot \sin(\delta) - \frac{X}{R^2 + X^2} \cdot V^2 \quad (1.2)$$

wherein the meaning of the notations used in the equations can be found in the Table 1 above.

The resistance R of the interface impedance 3 can be designed with a low value. Thus, the resistance R can be neglected for qualitative analysis leaving the following expression:

$$Pe \approx \frac{E \cdot V}{X} \cdot \sin(\delta) \quad (1.3)$$

$$Qe \approx \frac{E \cdot V}{X} \cdot \cos(\delta) - \frac{V^2}{X} \quad (1.4)$$

Any event in the grid will produce a change in the grid voltage magnitude V, or a change in the grid voltage phase angle which produces a change in the angle δ between $\bar{E}$ and $\bar{V}$, or both type of changes. In this way, the active power Pe and the reactive power Qe from the VSC unit 5 will change accordingly to the type of grid event (V change or δ change or both changes) and to the value of the interface impedance 3 R+jX, as shown in equations (1.3) and (1.4), if the VSC voltage $\bar{E}$ remains unchanged and controlled.

During the grid event, further stability actions can be performed in order to provide the desired active power Pe and reactive power Qe response to support the utility grid 2 by controlling, in a dynamic way, the magnitude and phase of the VSC voltage $\bar{E}$.

For the VSC control, an internal rotating d-q axis reference frame is used for generating the phasor $\bar{E}$ from given components Ed and Eq in the direct axis and quadrature axis, respectively.

In order to provide the VSC unit with similar stability mechanisms as a normal synchronous generator, similar internal voltage dynamic transient responses are introduced by controlling the VSC voltage $\bar{E}$ in accordance with instantaneous changes in grid voltage $\bar{V}$ and VSC currents $\bar{I}$. Furthermore, dynamics for voltage angle δ swings, active power swings, inertial response, synchronizing power and damping are introduced also by controlling the instantaneous angle θe of the internal rotating d-q axis reference frame.

In the present invention, the phasor $\bar{E}$ is generated from given components of Ed and Eq in the direct axis and quadrature axis of the internal rotating d-q reference frame, respectively. During grid events the inherent active/reactive power response (described by equations 1.1 and 1.2) can be further enhanced by adding dynamic transient voltage components, ΔEd' and ΔEq', on terminal voltages references, Ed and Eq, which are established by the calculation algorithm 8—cf. FIG. 1. The calculation algorithm 8 takes the instantaneous measured values of $\bar{V}$ and $\bar{I}$ decomposed in d-q components and generates the dynamic transient voltage components ΔEd' and ΔEq'.

FIG. 2 shows the dynamic transient components ΔEd' and ΔEq' which produces a dynamic transient change of phasor $\bar{E}$. The calculation algorithm 8 can be programmed for generating dynamic voltage components ΔEd' and ΔEq' for emulating the dynamic behavior of the internal voltage of a synchronous generator, or it can be programmed in different ways to provide different desired dynamic components of VSC terminal voltage $\bar{E}$ when variations of utility grid voltages $\bar{V}'$ and/or currents $\bar{I}'$ are experienced in order to support the utility grid.

In the present invention, the instantaneous rotated angle θe of the internal rotating d-q reference frame can be controlled in order to introduce the desired dynamics in the angle δ between voltages $\bar{E}$ and $\bar{V}$.

The inherent active power response due to grid events activates the emulation of rotor swings and power swings similarly to a synchronous generator by comparing the actual power Pe and the set point Po. The dynamics of synchronous generator rotor swings are emulated as angle swings of the internal d-q reference frame, which in turn is reflected as voltage angle δ swings and electrical power Pe swings.

To introduce inertial response the rotational speed ωe of the d-q reference frame is accelerated or decelerated according to the difference between the actual active power Pe and the set point Po and according to a desired value of inertia which produces the desired active power swing for inertial response. The value of the emulated inertia can be freely programmed. No grid frequency measurements are needed.

To introduce a power swing damping component a term in phase with ωe deviation is added to the generated active power Pe. To introduce a synchronizing power component a term in phase with δ swings is added to the generated active power Pe.

Other types of control can be used for controlling the instantaneous rotated angle θe of the internal rotating d-q reference in order to introduce the desired response of the VSC for utility grid stability and Pe and Qe control.

FIG. 4 illustrates the reactive power Qe response in a situation where the model according to the invention is applied to a weak utility grid containing synchronous generators. The utility grid load is increased by a large variation of inductive load. The reactive power response is enhanced by dynamic control of the VSC voltage $\bar{E}$.

FIG. 5 illustrates (B-line) the active power response Pe in a situation where the model according to the invention is applied to a weak utility grid containing synchronous generators. The utility grid load is increased by a large variation of resistive load. The active power response is enhanced by dynamic control of the VSC voltage $\bar{E}$ and by inertial response, power swings and damping introduced by dynamic control of the internal d-q reference frame angle θe. The other waveform (A-line) is a comparison with the output provided by devices similar to stated in Hans-Peter Beck and WO 2009/022198 where the converter output is fully based on state variables calculations and converter current set point following. The A-line shows a time delay after the grid event and limited rate increase of active power, As the active power response is firstly established by a condition of the VSC terminal voltage $\bar{E}$ and the impedance 3, the effect is inherent and takes place instantaneously which is different to what can be provided by prior art systems. In addition, the voltage angle swing calculation includes a damping component which can be further programmed according to utility grid stability needs. The voltage angle swing is calculated to provide positive synchronizing power and positive damping capabilities to the utility grid.

Furthermore, again referring to FIG. 1 the present invention provides active and reactive powers control as is normally implemented with power electronics converters. The invention provides the possibility for fast and decoupled following of set points for generated active Pe and/or reactive Qe powers by means of Po and Qo signals manipulated by controllers 7. The fast changes in generated active and/or reactive powers are performed by algebraic calculations 9 of static components Eds and Eqs of the VSC terminal voltages, Ed and Eq, on the arbitrary d-q reference frame. The new static Eds and Eqs components are calculated considering the actual values of utility grid voltages Vd and Vq and the manipulated values Po and Qo from the controllers in order to obtain the desired active and/or reactive power decoupled fast changes. The static components calculation block 9 has the appropriated set of algebraic equations and parameters to generate a change in generated active Pe or reactive Qe powers by manipulating Po or Qo, respectively.

The following set of algebraic equations are implemented into block 9 of FIG. 1 for calculating the appropriate static components Eds and Eqs for a desired input of active power target Po and reactive power target Qo:

$$Eds = \frac{K1}{Vd^2 + Vq^2} \cdot [(R1 \cdot Vd - X1 \cdot Vq) \cdot Po + (X1 \cdot Vd - R1 \cdot Vq) \cdot Qo] + (K2 \cdot Vd + K3) \quad (1.5)$$

$$Eqs = \quad (1.6)$$
$$\frac{K4}{Vd^2 + Vq^2} \cdot [(X1 \cdot Vd - R1 \cdot Vq) \cdot Po - (R1 \cdot Vd - X1 \cdot Vq) \cdot Qo] +$$
$$(K5 \cdot Vq + K6)$$

where R1 and X1 are estimated values of resistance and reactance which are chosen in coordination with the grid impedance 3 design, and K1, K2, K3, K4, K5 and K6 are desired constants. Nevertheless, this set of equations can be modified according to desired response of the VSC.

The manipulated values from the controllers, Po and Qo, act independently on the active and reactive powers of the VSC.

Figure 7:
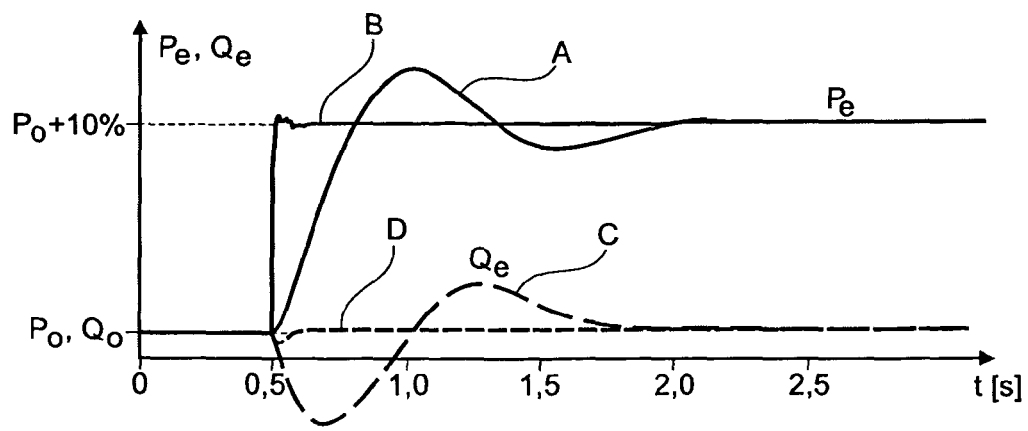

These fast and decoupled changes present the same advantages than power converters with decoupled d-q currents control, but are not possible with synchronous generators due to their inherent low response to set point changes and permanently coupled active and reactive powers—cf. FIG. 7. In FIG. 7 the reactive power is decoupled (D line) but it is inherently coupled in a synchronous machine (C line). The invention stated in Hans-Peter Beck and WO 2009/022198 emulates the A-line and C-line and cannot provide fast set point changes as the B-line and the D-line.

Figure 1:
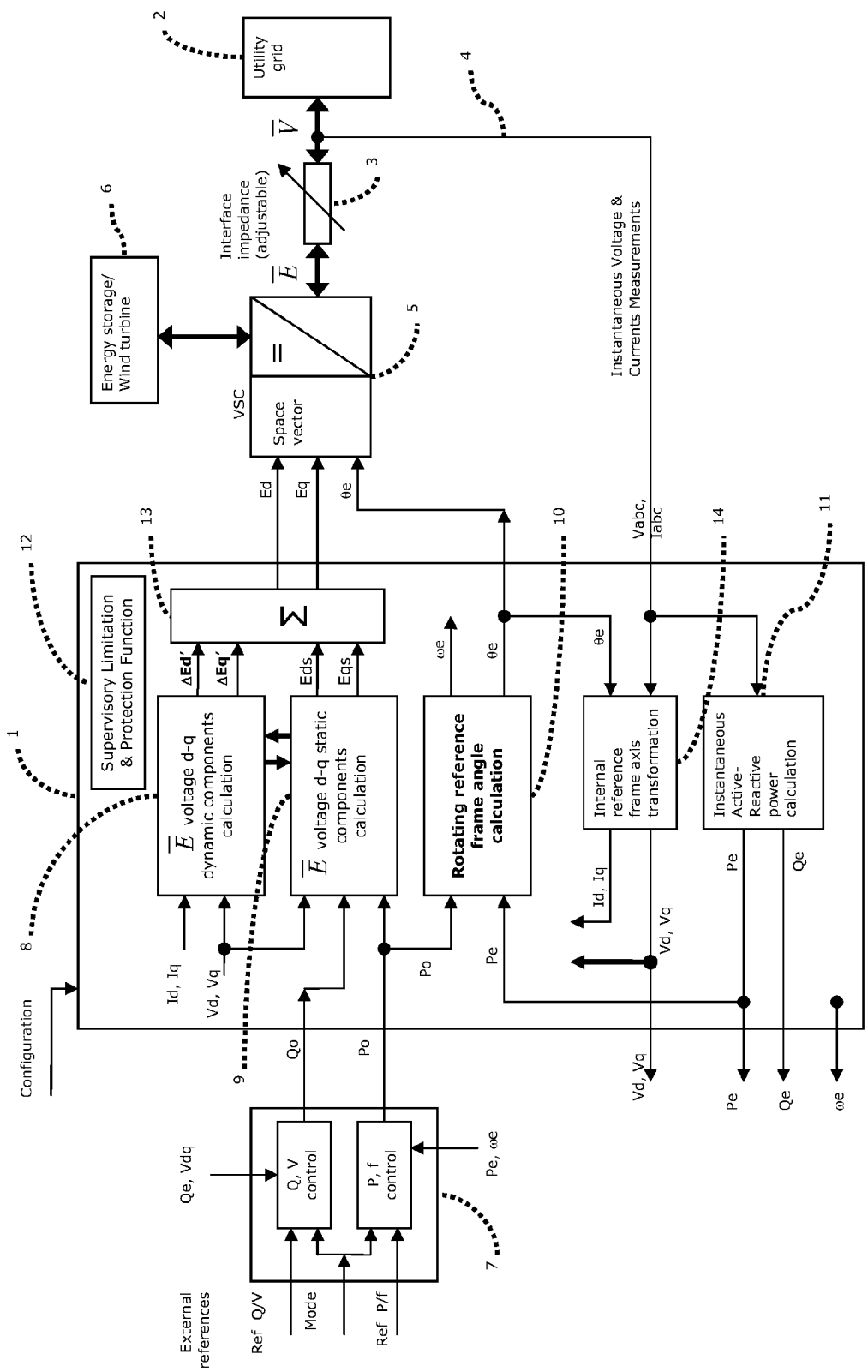
Figure 2:
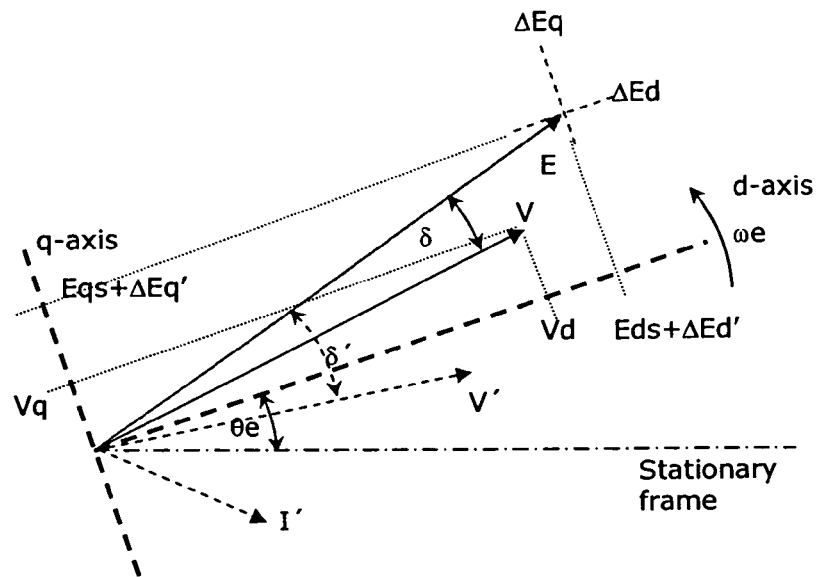
Figure 3:
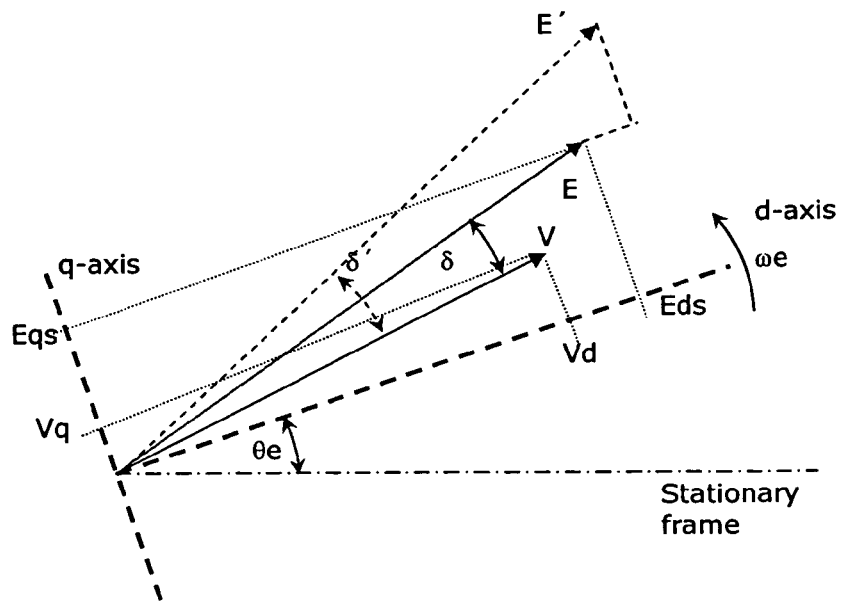
FIG. 3 shows a fast change in phasor E by changing the static components Eds and Eqs from algebraic calculations. The change in phasor E in this way produces the exact change in active Pe and/or reactive Qe powers.
Figure 4:
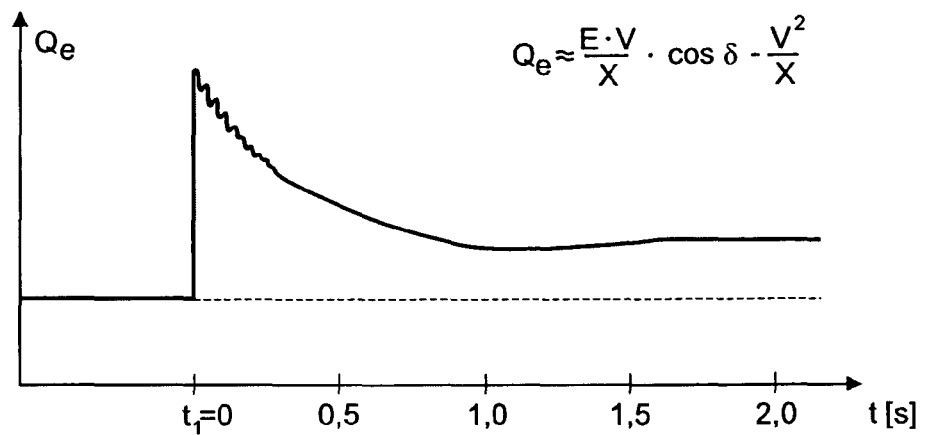
Figure 5:
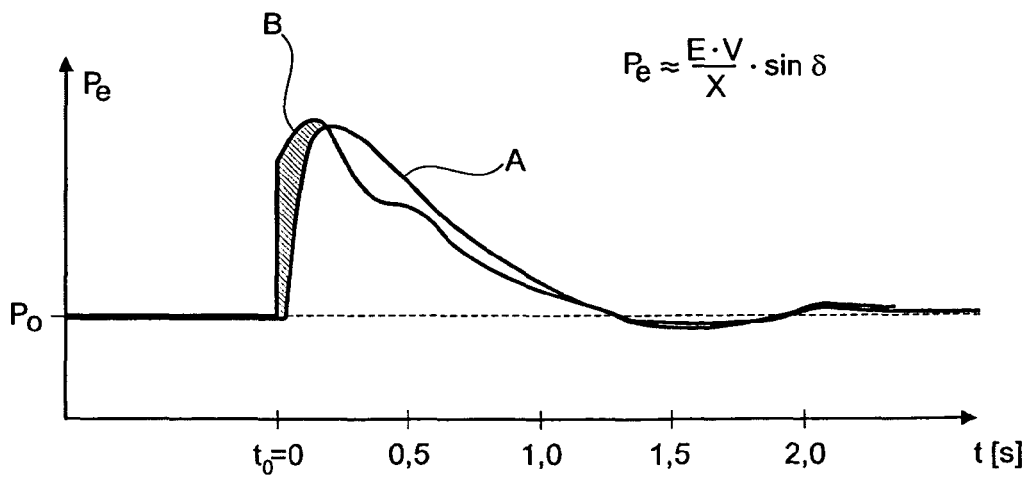
Figure 6:
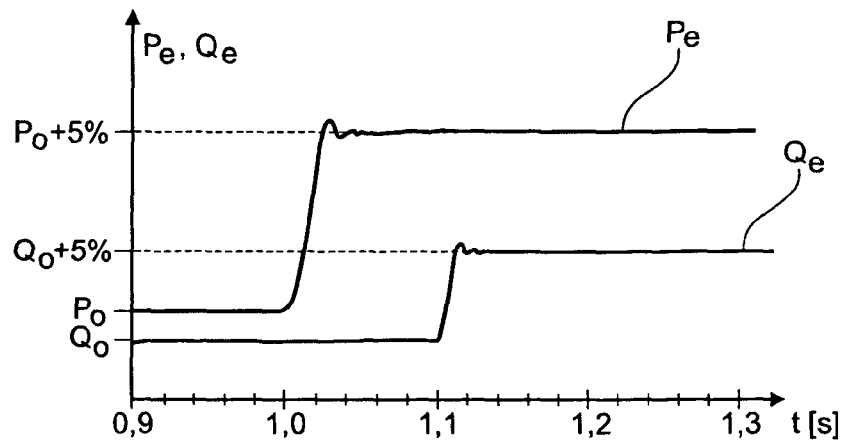
FIG. 6 shows the response of the invention when changing the set points of active Pe and reactive Qe powers in a situation when the invention is connected to a strong utility grid 2. The responses in active and reactive powers are decoupled.

A supervisory limitation & protection function 12—see FIG. 1—is employed for limiting the VSC currents, the VSC voltages Ed and Eq, the voltage difference angle δ, the active power Pe or reactive power Qe or a combination of these. Although one single block 12 is shown in FIG. 1, more than one supervisory function may be used to perform the limitation and protection functions. The limitation & protection function is useful because the VSC might be overloaded when operating near the rated power output and a grid event is happening. The limits may be absolute limits, time dependant limits, operation state dependant or a combination thereof.

Figure 8:
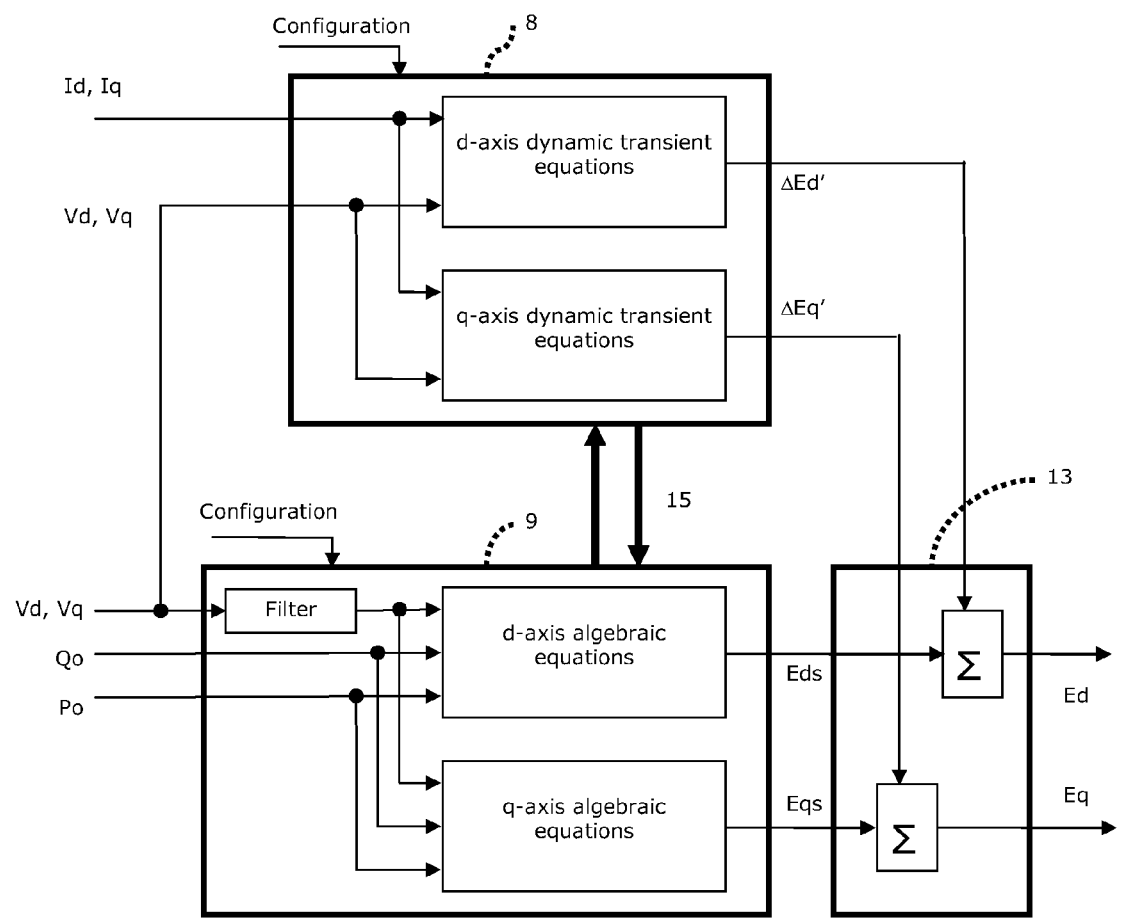

FIG. 8 illustrates the block structure for the calculation of the internal voltage E components on the rotating reference frame d-q. The static components of the voltage E are calculated with an algorithm implemented in block 9 of FIG. 8. This block contains algebraic equations expressed in the direct and quadrature axis d-q and based in equations (1.5) and (1.6). Such algorithm receives as inputs the actual terminal voltage V in the d-q reference frame and the static power targets Po and Qo from the controller 7—cf. FIG. 1. A filter for the terminal voltage V is incorporated in 9 for better performance. The dynamic transient components of the internal voltage E are calculated with an algorithm implemented in block 8 which contains dynamic voltage equations expressed in the direct and quadrature axis d-q. The dynamic equations emulate in a suitable way a desired voltage behavior similarly to a synchronous machine in terms of voltage transients. Such algorithm receives as inputs the actual terminal voltage V in the d-q reference frame and the actual terminal currents I in the d-q reference frame. The static and dynamic components of the internal voltage E are added in block 13 by a suitable summation algorithm.

Blocks 8 and 9 communicates with each other via communication channel 15 giving flags and/or numerical values for better static and dynamic performance of the invention during different grid and control events. The algorithms implemented in blocks 8 and 9 can be easily modified or programmed through the input Configuration in order to provide different desired responses on the components of the internal voltage E.

Figure 9:
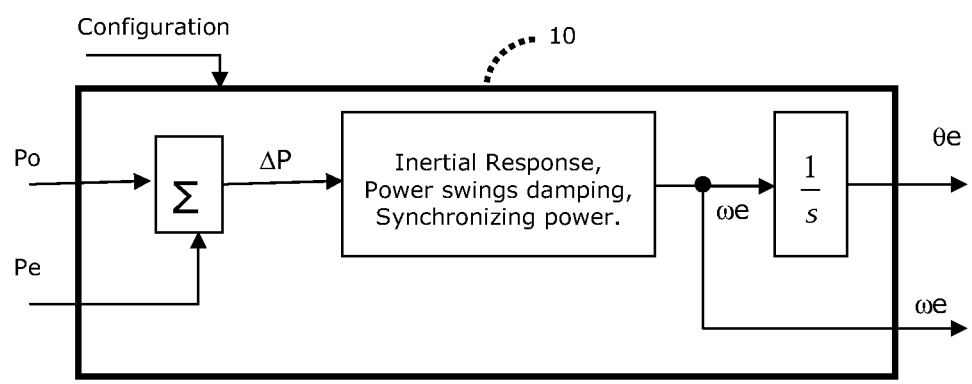

FIG. 9 illustrates the block structure 10 for the calculation of the instantaneous rotated angle θe and speed ωe of the internal rotating reference frame d-q. The calculation is done with a mathematical algorithm which emulates the behavior of the rotor of the synchronous generator, such as inertial response, power swings damping and synchronizing power. The response is reflected in the instantaneous angle θe and speed ωe of the internal rotating reference frame d-q. The inputs for the calculation are the static active power target Po and the actual active power output Pe. The respective mathematical algorithm can be easily modified or programmed through the input Configuration to provide different desired responses on the instantaneous angle θe and/or speed ωe.

The invention claimed is:

1. A method of operating an electric energy source using a voltage source converter configured to receive control signals from an associated calculating unit, the electric energy source operatively connected with a power utility grid having a grid voltage, the method comprising:
receiving, at the calculating unit, at least one of a pre-defined algorithm and a pre-defined parameter, wherein the pre-defined algorithm and the pre-defined parameter are selected to operate the electric energy source to behave substantially as a synchronous machine according to one or more selected electrical parameters;
determining an occurrence of a grid-related event based on a measured change in the grid voltage;
calculating, using the received pre-defined algorithm and pre-defined parameter, and based on at least one of the grid voltage and a measured current at an output of the voltage source converter, internal voltage components Ed and Eq relative to a rotating d-q reference frame and which emulate an internal voltage of the synchronous machine, wherein calculating the internal voltage components Ed and Eq comprises:
calculating respective static voltage components, Eds and Eqs that emulate a static behavior of the internal voltage of the synchronous machine, wherein the static voltage components Eds and Eqs are calculated based on a determined active power target Po and a determined reactive power target Qo, and
calculating respective dynamic voltage components ΔEd' and ΔEq' that emulate a dynamic behavior of the internal voltage of the synchronous machine; and
applying the calculated internal voltage components Ed and Eq to the voltage source converter to operate electric energy source to behave substantially as the synchronous machine during the grid-related events.

2. The method of claim 1, wherein the electric energy source comprises a wind power facility, the wind power facility including one of a single wind turbine and a wind power plant comprising a plurality of wind turbines.

3. The method of claim 1, wherein the synchronous machine comprises a synchronous generator.

4. The method of claim 1, wherein one of the selected electrical parameters is selected from a group consisting of: an active power response to one of the grid-related events, a reactive power response to one of the grid-related events, an inertial response to active power imbalances in the power utility grid, a voltage response and a damping of active power swings.

5. The method of claim 1, further comprising: summing the static voltage component Eds with the dynamic voltage component ΔEd' to form the internal voltage component Ed; and summing the static voltage component Eqs with the dynamic voltage component ΔEq' to form the internal voltage component Eq.

6. A method for emulating the behavior of an electric energy source operatively connected with a power utility grid, the method comprising:
   implementing a simulation model wherein the electric energy source is modeled to behave substantially as a synchronous machine according to one or more selected electrical parameters during one or more grid-related events;
   calculating, using the simulation model and based on properties of the grid-related events, internal voltage components Ed and Eq relative to a rotating d-q reference frame and which emulate an internal voltage of the synchronous machine, wherein calculating the internal voltage components Ed and Eq comprises:
      calculating respective static voltage components, Eds and Eqs that emulate a static behavior of the internal voltage of the synchronous machine, wherein the static voltage components Eds and Eqs are calculated based on a determined active power target Po and a determined reactive power target Qo, and
      calculating respective dynamic voltage components ΔEd' and ΔEq' that emulate a dynamic behavior of the internal voltage of the synchronous machine,
   wherein the internal voltage components Ed and Eq, when applied to a voltage source converter configured to operate the electric energy source, cause the electric energy source to behave substantially as a synchronous machine during the grid-related events.

7. The method of claim 6, wherein the electric energy source comprises a wind power facility, the wind power facility including one of a single wind turbine and a wind power plant comprising a plurality of wind turbines.

8. The method of dam 6, wherein the synchronous machine comprises a synchronous generator.

9. The method of claim 6, wherein one of the selected electrical parameters is selected from a group consisting of: an active power response to one of the grid-related events, a reactive power response to one of the grid-related events, an inertial response to active power imbalances in the power utility grid, a voltage response and a damping of active power swings.

10. A non-transitory computer readable storage medium containing a program which, when executed by one or more processors, performs an operation for controlling behavior of an electric energy source using a voltage source converter, the electric energy source operatively connected with a power utility grid having a grid voltage, the operation comprising:
   receiving at least one of a pre-defined algorithm and a pre-defined parameter, wherein the pre-defined algorithm and the pre-defined parameter are selected to operate the electric energy source to behave substantially as a synchronous machine according to one or more selected electrical parameters,
   determining an occurrence of a grid-related event based on a measured change in the grid voltage;
   calculating, using the received pre-defined algorithm and pre-defined parameter, and based on at least one of the grid voltage and a measured current at an output of the voltage source converter, internal voltage components Ed and Eq relative to a rotating d-q reference frame and which emulate an internal voltage of the synchronous machine, wherein calculating the internal voltage components Ed and Eq comprises:
      calculating respective static voltage components, Eds and Eqs that emulate a static behavior of the internal voltage of the synchronous machine, wherein the static voltage components Eds and Eqs are calculated based on a determined active power target Po and a determined reactive power target Qo, and
      calculating respective dynamic voltage components ΔEd' and ΔEq' that emulate a dynamic behavior of the internal voltage of the synchronous machine; and
   applying the calculated internal voltage components Ed and Eq to the voltage source converter to operate the electrical energy source to behave substantially as the synchronous machine during the grid-related events.

11. A non-transitory computer readable storage medium containing a program which, when executed by one or more processors, performs an operation for emulating the behavior of an electric energy source operatively connected to a power utility grid, the operation comprising:
   implementing a simulation model wherein the electric energy source is modeled to behave substantially as a synchronous machine according to one or more selected electrical parameters during one or more grid-related events;
   calculating, using the simulation model and based on properties of the grid-related events, internal voltage components Ed and Eq relative to a rotating d-q reference frame and which emulate an internal voltage of the synchronous machine, wherein calculating the internal voltage components Ed and Eq comprises:
      calculating respective static voltage components, Eds and Egs that emulate a static behavior of the internal voltage of the synchronous machine, wherein the static voltage components Eds and Eqs are calculated based on a determined active power target Po and a determined reactive power target Qo, and
      calculating respective dynamic voltage components ΔEd' and ΔEq' that emulate a dynamic behavior of the internal voltage of the synchronous machine.

12. The method of claim 1, wherein the static voltage components Eds and Eqs are calculated further based on values Vd and Vq of the grid voltage.

13. The method of claim 12, further comprising filtering the values Vd, Vq, wherein calculating the static voltage components Eds and Eqs is performed using the filtered values.

14. The method of claim 12, wherein the received pre-defined algorithm specifies calculating the static voltage components Eds and Eqs according to:

$$Eds = \frac{K1}{Vd^2 + Vq^2}[(R1 \cdot Vd - X1 \cdot Vq) \cdot Po + (X1 \cdot Vd - R1 \cdot Vq) \cdot Qo] +$$
$$(K2 \cdot Vd + K3)$$

$$Eqs = \frac{K4}{Vd^2 + Vq^2}[(X1 \cdot Vd - R1 \cdot Vq) \cdot Po + (R1 \cdot Vd - X1 \cdot Vq) \cdot Qo] +$$
$$(K5 \cdot Vq + K6),$$

where R1 and X1 represent selected values of resistance and reactance of an interface impedance between the voltage source converter and the utility grid, and where K1, K2, K3, K4, K5, and K6 represent selected coefficients.

15. The method of claim 14, wherein one or more of R1, X1, K1, K2, K3, K4, K5, and K6 are received at the configuration input as pre-defined parameters.

16. The method of claim 1, further comprising:
calculating an instantaneous active power Pe at a point of connection with the utility grid;
calculating an angle θe of the rotating d-q reference frame based on the instantaneous active power Pe and a determined active power target Po; and
applying the calculated angle θe, along with the calculated internal voltage components Ed and Eq, to the voltage source converter to operate the electric energy source to behave substantially as the synchronous machine during the grid-related events.

17. The method of claim 16, further comprising:
measuring three-phase instantaneous values of the grid voltage and the measured current;
transforming, using the calculated angle θe, the measured three-phase instantaneous values of the grid voltage into voltage components Vd and Vq and the measured three-phase instantaneous values of the measured current into current components Id and Iq in the rotating d-q reference frame,
wherein calculating respective dynamic voltage components ΔEd' and ΔEq' is based on determined changes to one or more of Vd, Vq, Id, and Iq.

18. The method of claim 1, further comprising:
generating, based on a selected mode of a control system coupled with the calculating unit, at least one of the active power target Po and the reactive power target Qo; and
providing the generated active power target Po and reactive power target Qo to the calculating unit.

19. The method of claim 18, further comprising:
receiving, at the control system, respective reference values for reactive power, voltage, active power, and frequency; and
receiving a mode signal configured to select between (i) active power control mode, (ii) frequency control mode, (iii) reactive power control mode, and (iv) voltage control mode,
wherein the control system updates the active power target Po provided to the calculating unit during modes (i) and (ii), and wherein the control system updates the reactive power target Qo provided to the calculating unit during modes (iii) and (iv).

* * * * *